United States Patent
Zhang et al.

(10) Patent No.: US 12,452,883 B2
(45) Date of Patent: Oct. 21, 2025

(54) METHODS AND APPARATUS OF ENHANCED COUNTING SCHEMES FOR CANDIDATES OF ENHANCED PDCCH TRANSMISSION

(71) Applicant: Lenovo (Beijing) Limited, Beijing (CN)

(72) Inventors: Yi Zhang, Beijing (CN); Chenxi Zhu, Fairfax, VA (US); Bingchao Liu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 281 days.

(21) Appl. No.: 18/248,946

(22) PCT Filed: Oct. 22, 2020

(86) PCT No.: PCT/CN2020/122717
§ 371 (c)(1),
(2) Date: Apr. 13, 2023

(87) PCT Pub. No.: WO2022/082572
PCT Pub. Date: Apr. 28, 2022

(65) Prior Publication Data
US 2024/0023132 A1    Jan. 18, 2024

(51) Int. Cl.
*H04L 5/00* (2006.01)
*H04W 72/04* (2023.01)
(Continued)

(52) U.S. Cl.
CPC ..... *H04W 72/232* (2023.01); *H04W 72/0446* (2013.01); *H04W 72/0453* (2013.01)

(58) Field of Classification Search
CPC .......... H04W 72/232; H04W 72/0446; H04W 72/0453
See application file for complete search history.

(56) References Cited

U.S. PATENT DOCUMENTS

| | | | |
|---|---|---|---|
| 2015/0078307 A1* | 3/2015 | Ohta | H04W 76/28 370/329 |
| 2020/0314678 A1 | 10/2020 | Lee et al. | |

(Continued)

FOREIGN PATENT DOCUMENTS

| | | |
|---|---|---|
| CN | 110149180 A | 8/2019 |
| CN | 110167036 A | 8/2019 |

(Continued)

OTHER PUBLICATIONS

PCT/CN2020/122717, "International Preliminary Report on Patentability", PCT Application No. PCT/CN2020/122717, May 4, 2023, 7 pages.

(Continued)

*Primary Examiner* — Melvin C Marcelo
(74) *Attorney, Agent, or Firm* — FIG. 1 Patents

(57) ABSTRACT

Methods and apparatus of enhanced counting schemes for candidates of enhanced PDCCH are disclosed. The method includes: counting, by a processor, candidates of PDCCH that are to be transmitted with a plurality of transmissions, based on a candidate counting scheme, wherein the candidates are linked with one another for transmissions of the PDCCH; generating, by the processor, configuration signaling of one or more search space sets for monitoring transmissions of the PDCCH; and transmitting, by a transmitter, the configuration signaling and the candidates of the PDCCH.

20 Claims, 5 Drawing Sheets

---

602
counting, by a processor, candidates of Physical Downlink Control Channel (PDCCH) that are to be transmitted with a plurality of transmissions, based on a candidate counting scheme, wherein the candidates are linked with one another for transmissions of the PDCCH 604
generating, by the processor, configuration signaling of one or more search space sets for monitoring transmissions of the PDCCH 606
transmitting, by a transmitter, the configuration signaling and the candidates of the PDCCH

(51) Int. Cl.
*H04W 72/0446* (2023.01)
*H04W 72/0453* (2023.01)
*H04W 72/232* (2023.01)

(56) References Cited

U.S. PATENT DOCUMENTS

| | | | | |
|---|---|---|---|---|
| 2020/0404669 | A1* | 12/2020 | Seo | H04L 25/0238 |
| 2022/0038207 | A1* | 2/2022 | Frenne | H04L 5/0053 |
| 2023/0057605 | A1* | 2/2023 | MolavianJazi | H04L 5/0053 |
| 2023/0085896 | A1* | 3/2023 | Takeda | H04W 24/08 |
| 2024/0356705 | A1* | 10/2024 | Zhang | H04L 5/0053 |

FOREIGN PATENT DOCUMENTS

| | | |
|---|---|---|
| CN | 110324127 A | 10/2019 |
| CN | 111357389 A | 6/2020 |
| CN | 111758286 A | 10/2020 |
| WO | 2019139300 A1 | 7/2019 |
| WO | 2020064512 A1 | 4/2020 |
| WO | 2020102105 A1 | 5/2020 |
| WO | 2020197293 A1 | 10/2020 |
| WO | WO-2024071766 A1 * | 4/2024 |

OTHER PUBLICATIONS

PCT/CN2020/122717, "International Search Report and Written Opinion", PCT Application No. PCT/CN2020/122717, Jun. 30, 2021, 8 pages.
20958155.2, "European Search Report", Application No. 20958155.2, Jun. 18, 2024, 60 pages.
Huawei, HiSilicon, "Corrections on PDCCH enhancement for URLLC", 3GPP TSG RAN WG1 Meeting #100bis-e R1-2001545 Mobile Competence Centre; 650, Route Des Lucioles ; F-06921 Sophia-Antipolis Cedex ; France, Apr. 20, 2020, 10 pages.
"Foreign Notice of Allowance", EP Application No. 20958155.2, Jul. 4, 2025, 82 pages.

* cited by examiner

METHODS AND APPARATUS OF ENHANCED COUNTING SCHEMES FOR CANDIDATES OF ENHANCED PDCCH TRANSMISSION

FIELD

The subject matter disclosed herein relates generally to wireless communication and more particularly relates to, but not limited to, methods and apparatus of enhanced counting schemes for candidates of enhanced Physical Downlink Control Channel (PDCCH) transmission.

BACKGROUND

The following abbreviations and acronyms are herewith defined, at least some of which are referred to within the specification:
Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Uplink Shared Channel (PUSCH), Bandwidth Part (BWP), Control Channel Element (CCE), Control Element (CE), Control Resource Set (CORESET), Common Search Space (CSS), Downlink Control Information (DCI), Frequency-Division Multiplexing (FDM), Frequency Division Multiple Access (FDMA), Identification (ID), Media Access Control (MAC), Physical Resource Block (PRB), Resource Block (RB), Resource-Element Group (REG), Radio Network Temporary Identifier (RNTI), Radio Resource Control (RRC), Reference Signal (RS), Subcarrier Spacing (SCS), Single Frequency Network (SFN), Transport Block (TB), Time-Division Multiplexing (TDM), Transmit Receive Point (TRP), UE-specific Search Space (USS), Cell Radio Network Temporary Identifier (C-RNTI), Frequency Range 1 (FR1), Frequency Range 2 (FR2), Synchronization Signal (SS), Transmission Configuration Indication (TCI), Frequency-Division Multiplexed (FDMed), Time-Division Multiplexed (TDMed), Space Division Multiplexed (SDMed), Log Likelihood Ratio (LLR).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (E-PDCCH) allows exploitation of the additional resources to improve PDCCH transmission reliability and robustness. Multiple transmissions of the E-PDCCH may be transmitted from a same TRP or some different TRPs.

SUMMARY

Methods and apparatus of enhanced counting schemes for candidates of enhanced PDCCH transmission are disclosed.

According to a first aspect, there is provided a method, including: counting, by a processor, candidates of Physical Downlink Control Channel (PDCCH) that are to be transmitted with a plurality of transmissions, based on a candidate counting scheme, wherein the candidates are linked with one another for transmissions of the PDCCH; generating, by the processor, configuration signaling of one or more search space sets for monitoring transmissions of the PDCCH; and transmitting, by a transmitter, the configuration signaling and the candidates of the PDCCH.

According to a second aspect, there is provided a method, including: receiving, by a receiver, a configuration signaling of one or more search space sets for monitoring transmissions of Physical Downlink Control Channel (PDCCH); receiving, by the receiver, candidates of the PDCCH that are transmitted with a plurality of transmissions; and decoding, by a processor, the PDCCH with the candidates using a decoding process according to a candidate counting scheme, wherein the candidates are linked with one another for transmissions of the PDCCH.

According to a third aspect, there is provided an apparatus, including: a processor that counts candidates of Physical Downlink Control Channel (PDCCH) that are to be transmitted with a plurality of transmissions, based on a candidate counting scheme, wherein the candidates are linked with one another for transmissions of the PDCCH; wherein the processor further generates configuration signaling of one or more search space sets for monitoring transmissions of the PDCCH; and a transmitter that transmits the configuration signaling and the candidates of the PDCCH.

According to a fourth aspect, there is provided an apparatus, including: a receiver that receives a configuration signaling of one or more search space sets for monitoring transmissions of Physical Downlink Control Channel (PDCCH); wherein the receiver further receives candidates of the PDCCH that are transmitted with a plurality of transmissions; and a processor that decodes the PDCCH with the candidates using a decoding process according to a candidate counting scheme, wherein the candidates are linked with one another for transmissions of the PDCCH.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
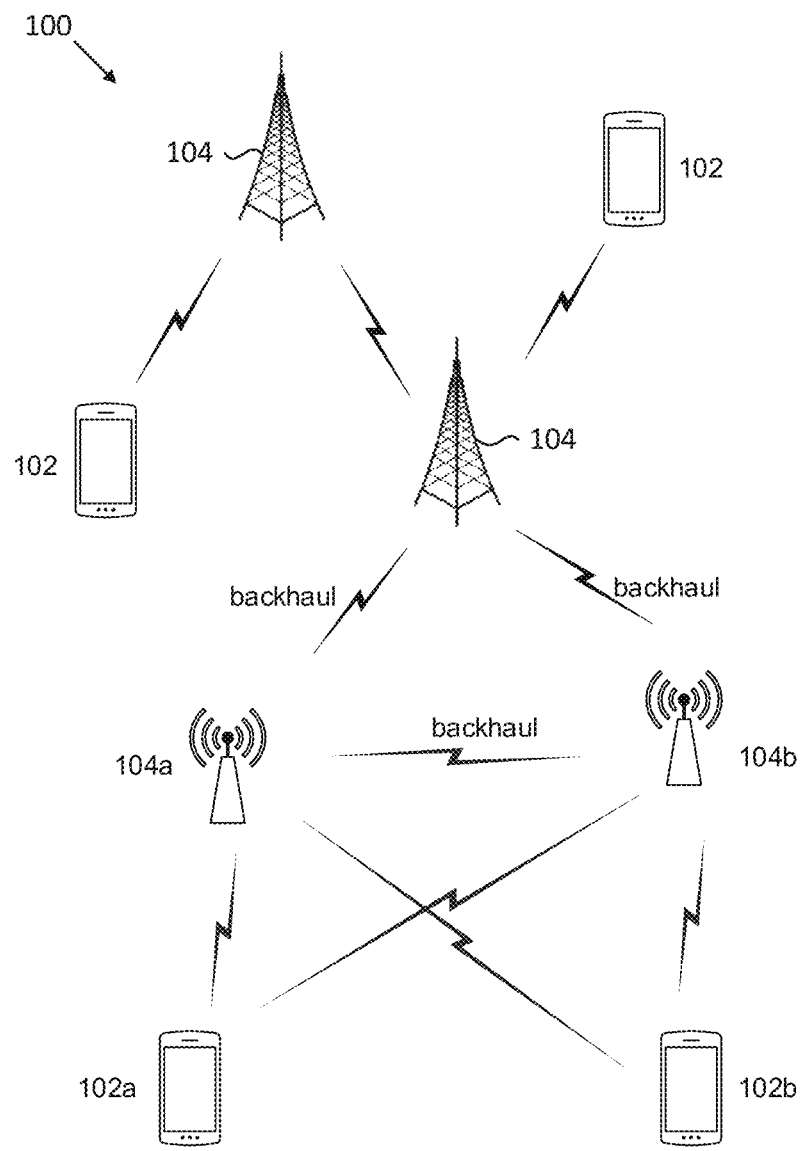
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
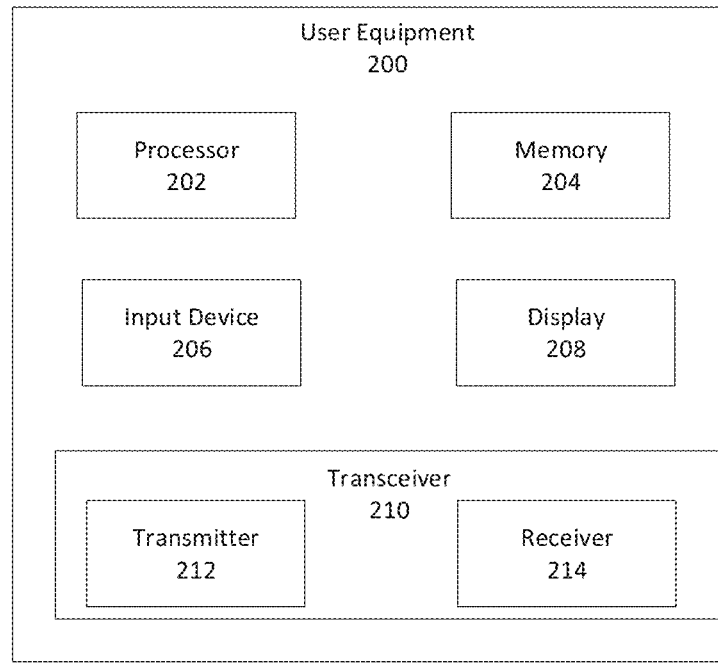
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
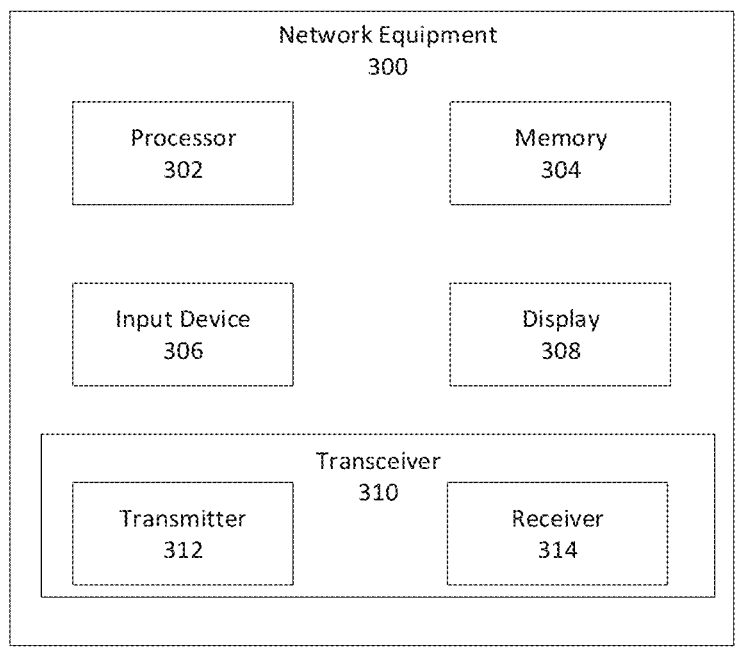
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

For normal PDCCH, a Downlink Control Information (DCI) is transmitted on only one candidate in the search space set. A UE will not expect to be configured with the number of monitoring candidates per slot or per span that exceeds the corresponding maximum numbers per slot or per span. However, for enhanced PDCCH transmission, one DCI may be transmitted with multiple candidates/repetitions to improve reliability, i.e., multiple candidates or multiple repeat transmissions may be used for enhanced PDCCH transmission.

Multiple transmissions of the enhanced PDCCH may include: different parts of the PDCCH being transmitted with different transmission candidates, and/or repetitions of the PDCCH being transmitted multiple times. Thus, the transmission candidates may be used for transmitting the same or different parts of the enhanced PDCCH.

Times of polar decoding (i.e., the number of times of blind detection of polar codes) may be different for different decoding behaviours for monitoring TDM/FDM based enhanced PDCCH transmission. In the disclosure, enhanced PDCCH candidate counting schemes are discussed on account of different decoding behaviours. The enhanced PDCCH candidate counting schemes should be aligned between gNB and UE to have the same understanding on PDCCH candidates. The number of counted monitored candidates per slot or per span is not expected to exceed the maximum number for blind detection.

For multiple TRP PDCCH reliability enhancement, it is possible that non-overlapping multi-chance transmitted PDCCH may be associated with different Transmission Configuration Indication (TCI) states in Time Division Multiplexing (TDM), Frequency Division Multiplexing (FDM) or SFN (Single Frequency Network) multiplexing schemes. To enable a PDCCH transmission with two TCI states, one Control Resource Set (CORESET) may be associated with two active TCI states. Alternatively, one search space (SS) set may be associated with two different CORESETs, or two SS sets may be associated with the two corresponding CORESETs.

In the current NR specification, there is a configured number of PDCCH candidates per Control Channel Element (CCE) aggregation level for a search space set.

For each DL Bandwidth Part (BWP) configured to a UE in a serving cell, the UE is provided by higher layers with $S \leq 10$ search space sets where, for each search space set from the S search space sets, the UE is provided the following by SearchSpace:
 a search space set index s, $0 \leq s < 40$, by searchSpaceId;
 an association between the search space set s and a CORESET p by controlResourceSetId;

a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;

an indication that search space set s is either a CSS set or a USS set by searchSpaceType.

In a search space set, the location of candidates is defined, where candidates are distributed evenly in the search space with starting CCE index of the first candidate determined by specified Hashing function.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

where
for any CSS, $$Y_{p,n_{s,f}^{\mu}} = 0;$$

for a USS, $$Y_{p,n_{s,f}^{\mu}} = \left( A_p \cdot Y_{p,n_{s,f}^{\mu}-1} \right) \bmod D,$$

$Y_{p,-1} = n_{RNTI} \neq 0$, $A_p=39827$ for pmod3=0, $A_p=39829$ for pmod3=1, $A_p=39839$ for pmod3=2, and D=65537;
i=0, ..., L−1;
$N_{CCE,p}$ is the number of CCEs, numbered from 0 to $N_{CCE,p}-1$, in CORESET p and, if any, per RB set;
$n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$;
$m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$;
for any CSS, $M_{s,max}^{(L)}=M_{s,0}^{(L)}$;
for a USS, $M_{s,max}^{(L)}$ is the maximum of $M_{s,n_{CI}}^{(L)}$ over all configured $n_{CI}$ values for a CCE aggregation level L of search space set s;
the Radio Network Temporary Identity (RNTI) value used for $n_{RNTI}$ is the C-RNTI.

For one search space set, the candidate number for an aggregation level is configured and the location of PDCCH candidate is well defined.

In the current NR specification, PDCCH candidates will be counted except the case of fully overlapped CCE set with previous candidate from the same search space set or any candidate from other search space set with identical scrambling, and same DCI payload size. The detail description is as follows.

A PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_j,n_{CI}}$ for a search space set $s_i < s_j$, or if there is a PDCCH candidate with index $n_{s_j,n_{CI}}$ and $n_{s_j,n_{CI}} < m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

In the current NR specification, the maximum number of monitored PDCCH candidates is specified based on subcarrier spacing (SCS) per slot or per span for an activated DL BWP. The UE may not detect the counted candidates with an index exceeding a specified maximum number. Detailed information about the maximum number of monitored PDCCH candidates is shown in the following tables.

Table 1 provides the maximum number of monitored PDCCH candidates, $M_{PDSSH}^{max,slot,\mu}$ per slot for a UE in a DL BWP with SCS configuration μ for operation with a single serving cell, where $\mu \in \{0, 1, 2, 3\}$.

TABLE 1

Maximum number $M_{PDCCH}^{max, slot, \mu}$ of monitored PDCCH candidates per slot for a DL BWP with SCS configuration $\mu \in \{0, 1, 2, 3\}$ for a single serving cell

| μ | Maximum number of monitored PDCCH candidates per slot and per serving cell $M_{PDCCH}^{max, slot, \mu}$ |
|---|---|
| 0 | 44 |
| 1 | 36 |
| 2 | 22 |
| 3 | 20 |

Table 2 provides the maximum number of monitored PDCCH candidates, $M_{PDCCH}^{max,(X,Y),\mu}$, per span for a UE in a DL BWP with SCS configuration μ for operation with a single serving cell, where $\mu \in \{0, 1\}$.

TABLE 2

Maximum number $M_{PDCCH}^{max, (X, Y), \mu}$ of monitored PDCCH candidates in a span for combination (X, Y) for a DL BWP with SCS configuration $\mu \in \{0, 1\}$ for a single serving cell Maximum number $M_{PDCCH}^{max, (X, Y), \mu}$ of monitored PDCCH candidates per span for combination (X, Y) and per serving cell

| μ | (2, 2) | (4, 3) | (7, 3) |
|---|---|---|---|
| 0 | 14 | 28 | 44 |
| 1 | 12 | 24 | 36 |

For PDCCH defined in Release 15 or 16, one DCI is transmitted with one candidate. The UE will monitor candidates in the search space set where one blind detection (e.g., polar decoding) is used for a candidate with an assumed DCI size. The candidates will be counted for monitoring except the case with fully overlapped CCE set as the previous candidate in the same search space set or candidate in other search space set if the monitored DCI is assumed with identical scrambling and same DCI payload size. A UE does not expect to be configured to monitor PDCCH candidates per slot or per span that exceed the corresponding maximum numbers per slot or per span.

For enhanced PDCCH discussed in Release 17, one DCI may be transmitted with multiple candidates or repetitions to improve reliability. There may be multiple possible decoding behaviours, e.g., with/without combination for multiple candidates or repetitions. Polar decoding times may be different for different decoding behaviours. In the disclosure, different counting schemes for monitoring enhanced PDCCH candidates are discussed, in which blind detection complexity is determined based on different decoding behaviours for TDM/FDM based enhanced PDCCH. The enhanced PDCCH candidate counting schemes should be aligned between gNB and UE to ensure the same understanding on PDCCH candidates, i.e., the number of monitored candidates per slot or per span is not expected to exceed the maximum number for blind detection.

In the disclosure, the term "predefined time period" may be used for reference to each slot or each span, as appropriate under the context. A first predefined time period, that is the slot or span for transmitting a first transmission or repetition of the enhanced PDCCH before other transmissions or repetitions, may be referred to as an initial predefined time period. The second, third and further slots or spans, that are for transmitting subsequent transmissions or repetitions of the enhanced PDCCH, may be referred to as subsequent predefined time periods.

Decoding Behavior for Enhanced PDCCH Transmission

From UE implementation point of view, channel estimation and polar decoding constitute two most important parts for complexity, where the maximum non-overlapped CCE number and PDCCH candidate number are specified to limit UE complexity, respectively. For polar decoding, the complexity is approximately linear with respect to the candidate number. Thus, polar decoding times may be used to count the PDCCH candidate number to determine blind detection complexity. However, times of polar decoding may be closely related with the UE decoding behaviour. Possible decoding behaviours for enhanced PDCCH transmission are discussed before the discussion on the counting schemes.

Figure 4:
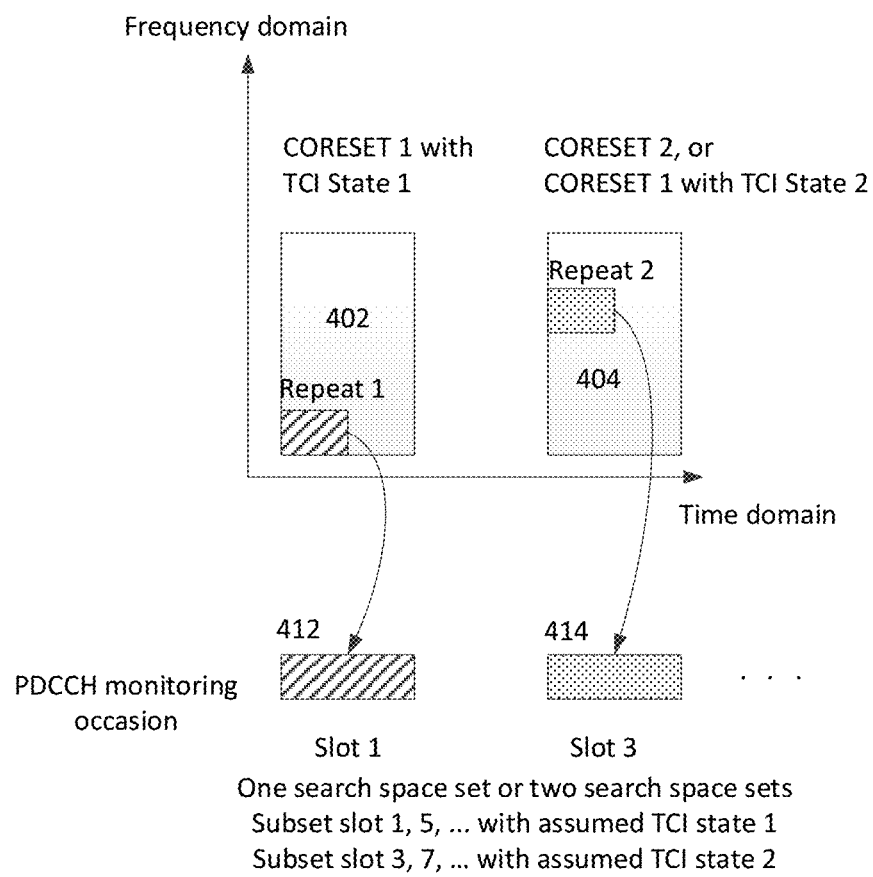
FIG. 4 is a schematic diagram illustrating an example of Time-Division Multiplexing (TDM) based enhanced PDCCH transmission in accordance with some implementations of the present disclosure.
Figure 5:
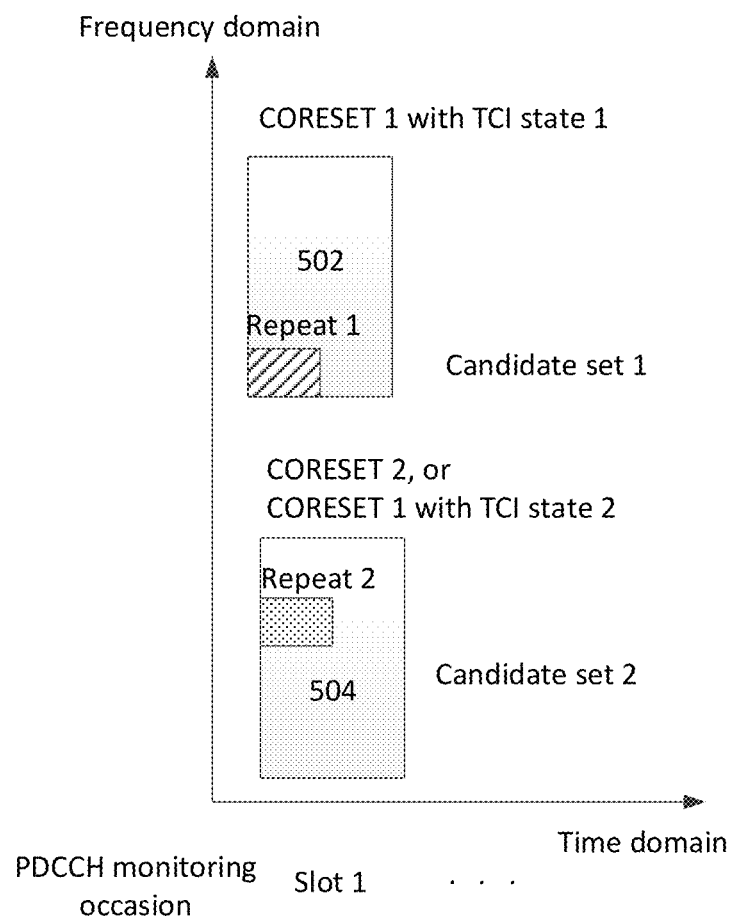
FIG. 5 is a schematic diagram illustrating another example of Frequency-Division Multiplexing (FDM) based enhanced PDCCH transmission in accordance with some implementations of the present disclosure.

Due to possible combinations among multiple candidates with repetition, there are four kinds of possible decoding behaviours. To simplify the illustration, the decoding behaviours are illustrated using one example of TDM based enhanced PDCCH transmission and another example of FDM based enhanced PDCCH transmission. FIG. 4 is a schematic diagram illustrating an example of TDM based enhanced PDCCH transmission in accordance with some implementations of the present disclosure. FIG. 5 is a schematic diagram illustrating another example of FDM based enhanced PDCCH transmission in accordance with some implementations of the present disclosure. Here, in this example, two repeat transmissions are assumed, i.e., repeat 1 and repeat 2. In both examples, repeat transmissions of PDCCH are made on candidate from CORESET 1 (402, 502) with TCI state 1 and candidate from CORESET 1 with TCI state 2 or CORESET 2 (404, 504) with TCI state 2. In FIG. 4, in the time-frequency domain, the first repeat transmission (repeat 1) is made on a candidate from CORESET 1 402 from TRP 1 with TCI state 1; and the second repeat transmission (repeat 2) is made on a candidate from CORESET 1 with TCI state 2 or CORESET 2 404 from TRP 2 with TCI state 2. The candidates are monitored on PDCCH monitoring occasions in slot 1 412 and slot 3 414 in one search space set or two search space sets. In FIG. 5, the first repeat transmission (repeat 1) and the second repeat transmission (repeat 2) are FDMed, and the candidates are monitored on PDCCH monitoring occasion in slot 1.

The four kinds of decoding behaviours are explained in detail as follows, namely decoding behavior 0, decoding behavior 1, decoding behavior 2 and decoding behavior 3.

Decoding Behaviour 0 The first polar decoding is performed with Log Likelihood Ratio (LLR) based on the first repeat transmission and the second polar decoding is performed with LLR based on the second repeat transmission.

Decoding behaviour 0 is the same as decoding behaviour defined in Release 15 or 16. For TDM case in FIG. 4, the first polar decoding is made in slot 1 412 based on LLR from the first repeat transmission (repeat 1) and the second polar decoding is made in slot 3 414 based on LLR from the second repeat transmission (repeat 2). For FDM case in FIG. 5, the first polar decoding is made in slot 1 based on LLR from one transmission on candidate set 1 associated with CORESET 1 502 and the second polar decoding is made in slot 1 based on LLR from one transmission on candidate set 2 associated with CORESET 2 504.

Decoding Behaviour 1

The first polar decoding with LLR is performed based on the first repeat transmission and the second polar decoding with combined LLR is performed based on the first and second transmissions.

For TDM case in FIG. 4, the first polar decoding is made in slot 1 412 based on LLR from the first repeat transmission (repeat 1) and the second polar decoding is made in slot 3 414 based on combined LLR from the first and second repeat transmissions (repeat 1 and repeat 2). For FDM case in FIG. 5, the first polar decoding is made in slot 1 based on LLR from one transmission (repeat 1) on candidate set 1 and the second polar decoding is made in slot 1 based on combined LLR from two transmissions (repeat 1 and repeat 2) on candidate set 1 and candidate set 2.

Decoding Behaviour 2

Only one polar decoding is performed with combined LLR based on the first and second transmissions.

For TDM case in FIG. 4, there is no polar decoding made in slot 1 412. Only one polar decoding is made in slot 3 414 based on combined LLR from the first and second repeat transmissions (repeat 1 and repeat 2). For FDM case in FIG. 5, only one polar decoding is made in slot 1 based on combined LLR from two transmissions (repeat 1 and repeat 2) on candidate set 1 and candidate set 2.

Decoding Behaviour 3

The first polar decoding is performed with LLR based on the first repeat transmission and the second polar decoding is performed with LLR based on the second repeat transmission and the third polar decoding is performed with combined LLR based on the first and second transmissions.

For TDM case in FIG. 4, the first polar decoding is made in slot 1 412 based on LLR from the first repeat transmission (repeat 1); and the second polar decoding is made in slot 3 414 based on LLR from the second repeat transmission (repeat 2); and the third polar decoding is made in slot 3 414 based on combined LLR from the first and second repeat transmissions (repeat 1 and repeat 2). For extension, considering that LLR from the first transmission can be combined LLR from its previous transmission and the first transmission, it is possible there is an additional polar decoding in slot 1 412. For FDM case in FIG. 5, the first polar decoding is made in slot 1 based on LLR from one transmission (repeat 1) on candidate set 1; and the second polar decoding is made in slot 1 based on LLR from one transmission (repeat 2) on candidate set 2; and the third polar decoding is made in slot 1 based on combined LLR from two transmissions (repeat 1 and repeat 2) on candidate set 1 and candidate set 2.

When one encoding or rate matching chain is used for multiple candidates, the joint polar decoding may be performed based on concatenated LLRs from candidates. When encoding or rate matching is based on one repetition, the polar decoding may be made based on accumulated LLRs from repetition transmissions.

Polar decoding times (i.e., the number of times of polar decoding performed) may be used to count the number of enhanced PDCCH candidates for determining blind detection complexity. One polar decoding for one candidate or candidate combination is counted as one candidate.

With the maximum candidate number for blind detection is defined per slot or span for an activated BWP, different counting schemes are discussed since same or different slots/spans may be used for FDM based enhanced PDCCH transmission and TDM based enhanced PDCCH transmission. The candidates may be linked with one another for transmissions of the PDCCH. The blind detection schemes are related with assumptions on whether linkage between PDCCH candidates are explicitly known to UE and flexible or dynamic repeat transmission may be used by gNB. Different counting schemes are discussed with respect to different assumptions for candidate counting of TDM or FDM based enhanced PDCCH.

Candidate Counting Schemes for TDM Based Enhanced PDCCH

In case 1, it is assumed that two or more enhanced PDCCH candidates are used for one DCI transmission and UE knows explicitly the linkage between these enhanced PDCCH candidates before decoding. Furthermore, gNB always transmits the enhanced PDCCH on linked candidates together.

In this case, the enhanced PDCCH shall be transmitted on these linked candidates together. From UE decoding view, decoding behaviors 1 and 2 may be used. Corresponding to the two possible decoding behaviors, the following two counting schemes, counting schemes 1A and 2A, may be used.

Counting Scheme 1A

One candidate is counted for each slot or span. For the first decoding in a first slot or span (e.g., in slot 1 412 in FIG. 4), LLR is based on transmission on the first slot or span. For the second decoding in the second slot or span (e.g., in slot 3 414 in FIG. 4), LLR is combined based on transmissions on the first and second slots or spans.

For transmission with more than 2 repetitions, LLR is based on transmission on the first slot or span for one decoding in a first slot or span; and LLR is combined based on transmissions from the first slot or span to the current slot or span for one decoding in each of the subsequent slots or spans.

Counting Scheme 2A

Zero candidate is counted for a first slot or span (or an initial slot or span) and one candidate is counted for the second slot or span (or a subsequent slot or span). For the decoding in the second slot or span, LLR is combined based on transmissions in the first and second slots or spans (e.g. both slot 1 412 and slot 2 414 in FIG. 4).

For transmission with more than 2 candidates/repetitions, one candidate is counted only in the last slot or span.

In case 2, it is assumed that two or more enhanced PDCCH candidates are used for one DCI transmission, and UE may know explicitly the linkage between these enhanced PDCCH candidates. Furthermore, gNB may flexibly transmits enhanced PDCCH on linked candidates with desirable combination.

In this case, enhanced PDCCH may be transmitted on the first one of the linked candidates. Alternatively, enhanced PDCCH may be transmitted on the second one of the linked candidates; or enhanced PDCCH may be transmitted on both the first and the second ones of the linked candidates. From UE decoding view, decoding behavior 3 may be used. Corresponding to this possible decoding behavior, counting scheme 3A may be used. Here, the linked candidate number is 2. Thus, the window size for flexible combination is 2.

Counting Scheme 3A

One or two candidates are counted for the first slot or span and two candidates are counted for the second slot or span.

For the second slot/span, one decoding is made based on LLR derived from transmission on the second slot/span and one decoding is made based on combined LLR derived from transmission on the first and second slots/spans. Thus, two candidates are counted.

For the first slot/span, there may be two options. In the first option, one decoding is based on LLR derived from transmission on the first slot/span (i.e., one candidate is counted) for the case where there is no linkage with candidate from the previous monitoring slot/span. It may be used for the case where the start slot/span for linkage candidates may only be in even monitoring occasions.

In the second option, two candidates are counted for the case where there is a linkage with candidate from the previous monitoring slot/span. In detail, the linkage includes two possible cases. In one case, the first candidate is for slot/span n, i.e. the first slot/span and the second candidate is for slot/span n+1, i.e. the second slot/span. In the other case, the first candidate is for slot/span n−1, i.e. one mentioned previous span, and the second candidate is for slot/span n, i.e. the first slot/span, where one decoding is based on LLR derived from transmission in the previous slot/span and one decoding is based on combined LLR derived from transmissions in the previous and first slot/span. It may be used for the case that the start slot/span for linkage candidates is in any monitoring occasion.

For case 1 and case 2, they may be used with following configuration of CORESET(s) and search space set(s):
1. One CORESET with multiple TCI states where one enhanced PDCCH candidate of the linked candidates is associated with one TCI state;
2. One SS set associated with multiple different CORESETs where one candidate of linked candidates is associated with one CORESET; or
3. Multiple search space sets where one enhanced PDCCH candidate of linked candidates is associated with one SS set.

Besides case 1 and case 2, there are some other cases (case 3, in general), which may include: case 3A where UE does not know the linkage between these enhanced PDCCH candidates, when two or more enhanced PDCCH candidates are used for one DCI transmission; case 3B where one enhanced PDCCH candidate is associated with both TCI states of the CORESET; and case 3C where separate DCIs schedule the same PDSCH/PUSCH/RS/TB/etc., or result in the same outcome. For all these cases, it is not possible to make combination for different candidates. Decoding behavior 0, i.e., similar to decoding behavior in Release 15 or 16, may be used. Corresponding to this possible decoding behavior, counting scheme 0, i.e., similar to counting scheme in Release 15 or 16, may be used, where one candidate is counted for each slot or span.

As discussed above, four kinds of enhanced PDCCH candidate counting schemes are possible for TDM based enhanced PDCCH transmission.

Candidate Counting Schemes for FDM Based Enhanced PDCCH

In principle, behavior of combination between candidates is similar for both TDM based and FDM based enhanced PDCCH transmission. However, the counting schemes are different since candidates for TDM based scheme are in different slots/spans while candidates for FDM based scheme are in the same slot/span. Counting schemes for FDM based enhanced PDCCH are discussed with respect to three cases similar to the three cases defined for TDM based schemes.

For case 1, decoding behaviors 1 and 2 may be used. Corresponding to the possible decoding behaviors, counting scheme 1B or 2B may be used.

Counting Scheme 1B

Two candidates are counted with two decoding in the slot/span. For the first decoding, LLR is based on transmission on the first candidate. For the second decoding, LLR is combined based on transmission on the first and second candidates.

Counting Scheme 2B

One candidate is counted with one decoding in the slot/span. For the decoding, LLR is combined based on transmission on all linked candidates.

For case 2, decoding behavior 3 may be used. Corresponding to this possible decoding behavior, counting scheme 3B may be used.

In Counting Scheme 3B

Three candidates are counted with three decoding in the slot/span. For the first and second decoding, LLR is based on the transmission on the first and second candidates, respectively. For the third decoding, LLR is combined based on transmission on the first and second candidates.

For case 3, decoding behavior 0, i.e., similar to decoding behavior in Release 15 or 16, may be used. Corresponding to the possible decoding behavior, counting scheme 0, i.e., similar to counting scheme in Release 15 or 16, may be used, where two candidates with one decoding for each linked candidate are counted for each slot or span. For each decoding, LLR is based on transmission on each candidate.

For FDM based scheme, it may be up to UE implementation how it decodes all the candidates. Behaviour 1B or 2B may be considered, i.e. one or two candidates, for simplicity. For SFN based scheme, counting scheme in Release 15 may be used.

Alignment on Enhanced PDCCH Candidate Counting Scheme Between gNB and UE

To guarantee UE to monitor enhanced PDCCH candidates with the number not exceeding the maximum number, the counting scheme is aligned between gNB and UE such that there is the same understanding on enhanced PDCCH candidate number between gNB and UE. There are two approaches.

In one example, the gNB firstly determines the counting scheme based on performance requirement and UE reported capability. Then, it sends the configuration signalling (e.g., configuration signaling of one or a plurality of search space sets for monitoring transmission of the PDCCH) to notify the UE.

In another example, the UE firstly determines the decoding behaviour based on UE capability and realization algorithm. Then, the UE reports the assumed accounting scheme to gNB (e.g., one counting scheme related item for UE capability on blind detection), and the gNB will use it to count the enhanced PDCCH candidates.

Figure 6:
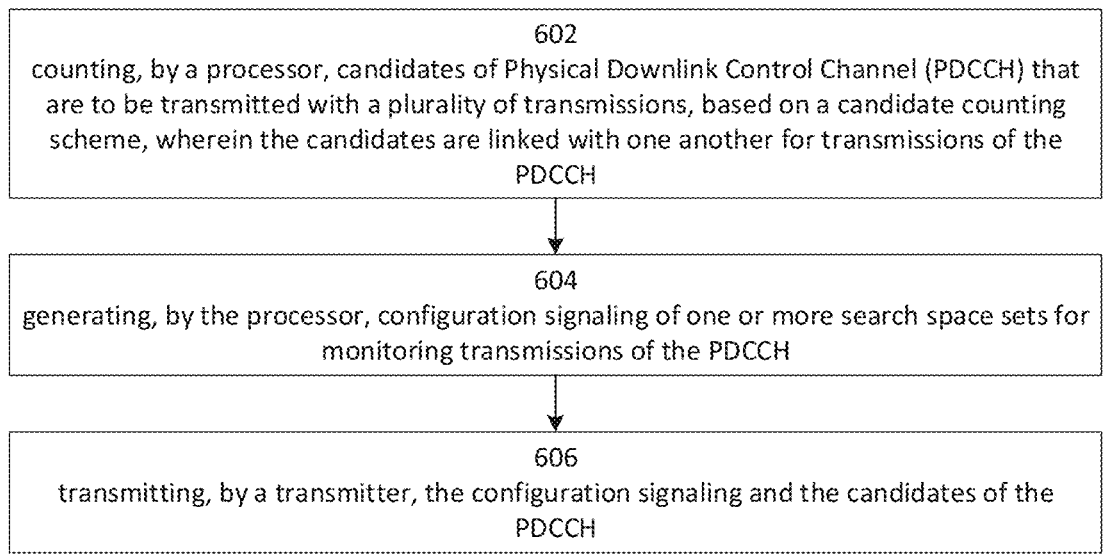
FIG. 6 is a flow chart illustrating steps of enhanced counting schemes for candidates of enhanced PDCCH transmission by NE in accordance with some implementations of the present disclosure.

FIG. 6 is a flow chart illustrating steps of enhanced counting schemes for candidates of enhanced PDCCH transmission by NE in accordance with some implementations of the present disclosure.

At step 602, the processor 302 of NE 300 counts candidates of Physical Downlink Control Channel (PDCCH) that are to be transmitted with a plurality of transmissions, based on a candidate counting scheme, wherein the candidates are linked with one another for transmissions of the PDCCH.

At step 604, the processor 302 of NE 300 generates configuration signaling of one or more search space sets for monitoring transmissions of the PDCCH.

At step 606, the transmitter 312 of NE 300 transmits the configuration signaling and the candidates of the PDCCH.

Figure 7:
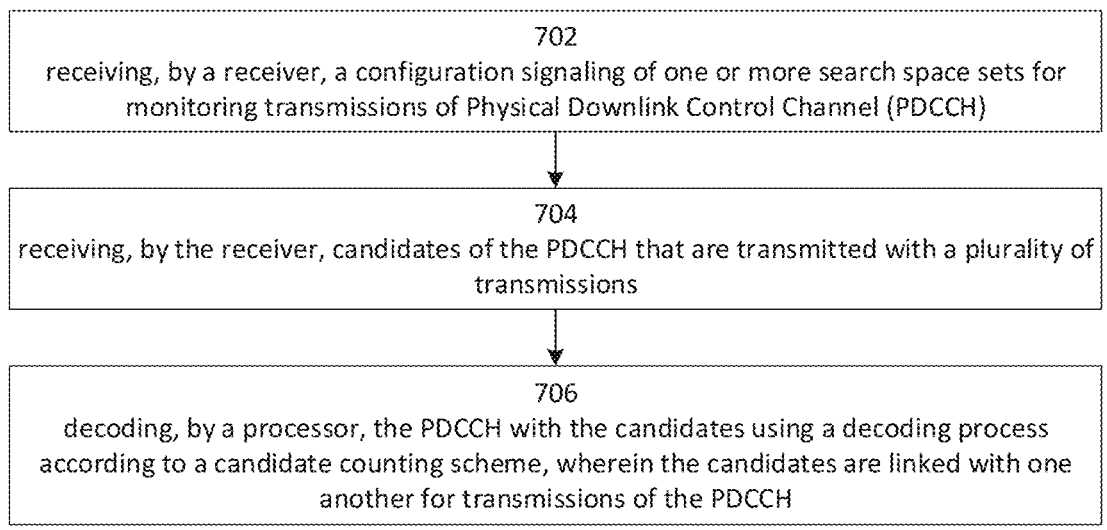
FIG. 7 is a flow chart illustrating steps of enhanced counting schemes for candidates of enhanced PDCCH transmission by UE in accordance with some implementations of the present disclosure.

FIG. 7 is a flow chart illustrating steps of enhanced counting schemes for candidates of enhanced PDCCH transmission by UE in accordance with some implementations of the present disclosure.

At step 702, the receiver 214 of UE 200 receives a configuration signaling of one or more search space sets for monitoring transmissions of Physical Downlink Control Channel (PDCCH).

At step 704, the receiver 214 of UE 200 receives candidates of the PDCCH that are transmitted with a plurality of transmissions.

At step 706, the processor 202 of UE 200 decodes the PDCCH with the candidates using a decoding process according to a candidate counting scheme, wherein the candidates are linked with one another for transmissions of the PDCCH.

In one aspect, some items as examples of the disclosure concerning a method of a NE or gNB may be summarized as follow:

1. A method, comprising:
   counting, by a processor, candidates of Physical Downlink Control Channel (PDCCH) that are to be transmitted with a plurality of transmissions, based on a candidate counting scheme, wherein the candidates are linked with one another for transmissions of the PDCCH;
   generating, by the processor, configuration signaling of one or more search space sets for monitoring transmissions of the PDCCH; and
   transmitting, by a transmitter, the configuration signaling and the candidates of the PDCCH.
2. The method of item 1, wherein one counted candidate corresponds to one polar decoding for a transmission candidate or a combination of transmission candidates.
3. The method of item 1, wherein transmissions of the PDCCH are Time-Division Multiplexed (TDMed); and one candidate is counted for each predefined time period.
4. The method of item 1, wherein transmissions of the PDCCH are Time-Division Multiplexed (TDMed); zero candidate is counted for an initial predefined time period; and one candidate is counted for a subsequent predefined time period.
5. The method of item 1, wherein transmissions of the PDCCH are Time-Division Multiplexed (TDMed); one candidate is counted for an initial predefined time period; and two candidates are counted for a subsequent predefined time period.
6. The method of item 1, wherein transmissions of the PDCCH are Time-Division Multiplexed (TDMed); two candidates are counted for an initial predefined time period; and two candidates are counted for a subsequent predefined time period.
7. The method of item 1, wherein transmissions of the PDCCH are Frequency-Division Multiplexed (FDMed); and two candidates are counted for each predefined time period.

8. The method of item 1, wherein transmissions of the PDCCH are Frequency-Division Multiplexed (FDMed); and one candidate is counted for each predefined time period.
9. The method of item 1, wherein transmissions of the PDCCH are Frequency-Division Multiplexed (FDMed); and three candidates are counted for each predefined time period.
10. The method of any one of items 1 to 9, wherein candidate numbers determined based on the candidate counting scheme for each predefined time period are not expected to exceed a predefined maximum number of monitored PDCCH candidates for each predefined time period
11. The method of any one of items 1 to 10, wherein the predefined time period is a slot or a span.
12. The method of any one of items 1 to 10, wherein the transmitter further transmits an indication of the candidate counting scheme.
13. The method of any one of items 1 to 10, further comprising:
receiving, by a receiver, information for determining the candidate counting scheme.
14. The method of item 13, wherein the information comprises a capability report of a remote device.
15. The method of item 13, wherein the information comprises an indication of a candidate counting scheme determined by a remote device.

In another aspect, some items as examples of the disclosure concerning a method of a UE or remote device may be summarized as follow:

16. A method, comprising:
receiving, by a receiver, a configuration signaling of one or more search space sets for monitoring transmissions of Physical Downlink Control Channel (PDCCH);
receiving, by the receiver, candidates of the PDCCH that are transmitted with a plurality of transmissions; and
decoding, by a processor, the PDCCH with the candidates using a decoding process according to a candidate counting scheme, wherein the candidates are linked with one another for transmissions of the PDCCH.
17. The method of item 16, wherein one counted candidate corresponds to one polar decoding for a transmission candidate or a combination of transmission candidates.
18. The method of item 16, wherein transmissions of the PDCCH are Time-Division Multiplexed (TDMed); and for the candidate counting scheme where one candidate is counted for each predefined time period:
one polar decoding is performed for each predefined time period based on Log Likelihood Ratio (LLR) in a respective predefined time period.
19. The method of item 16, wherein transmissions of the PDCCH are Time-Division Multiplexed (TDMed); and for the candidate counting scheme where zero candidate is counted for an initial predefined time period, and one candidate is counted for a subsequent predefined time period:
no polar decoding is performed for an initial predefined time period; and one polar decoding is performed for a subsequent predefined time period based on combined Log Likelihood Ratio (LLR) in the initial predefined time period and the subsequent predefined time period.
20. The method of item 16, wherein transmissions of the PDCCH are Time-Division Multiplexed (TDMed); and for the candidate counting scheme where one candidate is counted for an initial predefined time period, and two candidates are counted for a subsequent predefined time period:
one first polar decoding is performed for an initial predefined time period based on Log Likelihood Ratio (LLR) in the initial predefined time period; one second polar decoding is performed for an subsequent predefined time period based on LLR in the subsequent predefined time period; and one third polar decoding is performed for the subsequent predefined time period based on combined LLR in the initial and subsequent predefined time periods.
21. The method of item 16, wherein transmissions of the PDCCH are Time-Division Multiplexed (TDMed); and for the candidate counting scheme where two candidates are counted for an initial predefined time period, and two candidates are counted for a subsequent predefined time period:
two polar decodings are performed for each predefined time period, including: a first polar decoding based on Log Likelihood Ratio (LLR) a present predefined time period, and a second polar decoding based on combined LLR in a previous predefined time period and the present predefined time period.
22. The method of item 16, wherein transmissions of the PDCCH are Frequency-Division Multiplexed (FDMed); and for the candidate counting scheme where and two candidates are counted for each predefined time period:
for each predefined time period, one first polar decoding is performed based on Log Likelihood Ratio (LLR) from transmission of a first candidate; and one second polar decoding is performed based on combined LLR from transmissions of the first candidate and a second candidate.
23. The method of item 16, wherein transmissions of the PDCCH are Frequency-Division Multiplexed (FDMed); and for the candidate counting scheme where one candidate is counted for each predefined time period:
for each predefined time period, one polar decoding is performed based on combined Log Likelihood Ratio (LLR) from transmissions of a first candidate and a second candidate.
24. The method of item 16, wherein transmissions of the PDCCH are Frequency-Division Multiplexed (FDMed); and for the candidate counting scheme where three candidates are counted for each predefined time period:
for each predefined time period, one first polar decoding is performed based on Log Likelihood Ratio (LLR) from transmission of a first candidate; one second polar decoding is performed based on Log Likelihood Ratio (LLR) from transmission of a second candidate; and one third polar decoding is performed based on combined LLR from transmissions of the first candidate and the second candidate.
25. The method of any one of items 16 to 24, wherein candidate numbers determined based on the candidate counting scheme for each predefined time period are not expected to exceed a predefined maximum number of monitored PDCCH candidates for each predefined time period
26. The method of any one of items 16 to 25, wherein the predefined time period is a slot or a span.

27. The method of any one of items 16 to 25, wherein the receiver further receives an indication of the candidate counting scheme.

28. The method of any one of items 16 to 25, further comprising:
transmitting, by a transmitter, information for determining the candidate counting scheme.

29. The method of item 28, further comprising:
generating, by the processor, a capability report for determining the candidate counting scheme; and
wherein the information comprises the capability report.

30. The method of item 28, further comprising:
determining, by the processor, the candidate counting scheme; and
wherein the information comprises an indication of the candidate counting scheme determined.

In a further aspect, some items as examples of the disclosure concerning a NE or gNB may be summarized as follow:

31. An apparatus, comprising:
a processor that counts candidates of Physical Downlink Control Channel (PDCCH) that are to be transmitted with a plurality of transmissions, based on a candidate counting scheme, wherein the candidates are linked with one another for transmissions of the PDCCH; wherein the processor further generates configuration signaling of one or more search space sets for monitoring transmissions of the PDCCH; and
a transmitter that transmits the configuration signaling and the candidates of the PDCCH.

32. The apparatus of item 31, wherein one counted candidate corresponds to one polar decoding for a transmission candidate or a combination of transmission candidates.

33. The apparatus of item 31, wherein transmissions of the PDCCH are Time-Division Multiplexed (TDMed); and one candidate is counted for each predefined time period.

34. The apparatus of item 31, wherein transmissions of the PDCCH are Time-Division Multiplexed (TDMed); zero candidate is counted for an initial predefined time period; and one candidate is counted for a subsequent predefined time period.

35. The apparatus of item 31, wherein transmissions of the PDCCH are Time-Division Multiplexed (TDMed); one candidate is counted for an initial predefined time period; and two candidates are counted for a subsequent predefined time period.

36. The apparatus of item 31, wherein transmissions of the PDCCH are Time-Division Multiplexed (TDMed); two candidates are counted for an initial predefined time period; and two candidates are counted for a subsequent predefined time period.

37. The apparatus of item 31, wherein transmissions of the PDCCH are Frequency-Division Multiplexed (FDMed); and two candidates are counted for each predefined time period.

38. The apparatus of item 31, wherein transmissions of the PDCCH are Frequency-Division Multiplexed (FDMed); and one candidate is counted for each predefined time period.

39. The apparatus of item 31, wherein transmissions of the PDCCH are Frequency-Division Multiplexed (FDMed); and three candidates are counted for each predefined time period.

40. The apparatus of any one of items 31 to 39, wherein candidate numbers determined based on the candidate counting scheme for each predefined time period are not expected to exceed a predefined maximum number of monitored PDCCH candidates for each predefined time period 41. The apparatus of any one of items 31 to 40, wherein the predefined time period is a slot or a span.

42. The apparatus of any one of items 31 to 40, wherein the transmitter further transmits an indication of the candidate counting scheme.

43. The apparatus of any one of items 31 to 40, further comprising:
a receiver that receives information for determining the candidate counting scheme.

44. The apparatus of item 43, wherein the information comprises a capability report of a remote device.

45. The apparatus of item 43, wherein the information comprises an indication of a candidate counting scheme determined by a remote device.

In a yet further aspect, some items as examples of the disclosure concerning a UE or remote device may be summarized as follow:

46. An apparatus, comprising:
a receiver that receives a configuration signaling of one or more search space sets for monitoring transmissions of Physical Downlink Control Channel (PDCCH); wherein the receiver further receives candidates of the PDCCH that are transmitted with a plurality of transmissions; and
a processor that decodes the PDCCH with the candidates using a decoding process according to a candidate counting scheme, wherein the candidates are linked with one another for transmissions of the PDCCH.

47. The apparatus of item 46, wherein one counted candidate corresponds to one polar decoding for a transmission candidate or a combination of transmission candidates.

48. The apparatus of item 46, wherein transmissions of the PDCCH are Time-Division Multiplexed (TDMed); and for the candidate counting scheme where one candidate is counted for each predefined time period:
one polar decoding is performed for each predefined time period based on Log Likelihood Ratio (LLR) in a respective predefined time period.

49. The apparatus of item 46, wherein transmissions of the PDCCH are Time-Division Multiplexed (TDMed); and for the candidate counting scheme where zero candidate is counted for an initial predefined time period, and one candidate is counted for a subsequent predefined time period:
no polar decoding is performed for an initial predefined time period; and one polar decoding is performed for a subsequent predefined time period based on combined Log Likelihood Ratio (LLR) in the initial predefined time period and the subsequent predefined time period.

50. The apparatus of item 46, wherein transmissions of the PDCCH are Time-Division Multiplexed (TDMed); and for the candidate counting scheme where one candidate is counted for an initial predefined time period, and two candidates are counted for a subsequent predefined time period:
one first polar decoding is performed for an initial predefined time period based on Log Likelihood Ratio (LLR) in the initial predefined time period; one second polar decoding is performed for an subsequent predefined time period based on LLR in the subsequent predefined time period; and one third polar decoding is performed for the subsequent predefined time period based on combined LLR in the initial and subsequent predefined time periods.

51. The apparatus of item 46, wherein transmissions of the PDCCH are Time-Division Multiplexed (TDMed); and for the candidate counting scheme where two candidates are counted for an initial predefined time period, and two candidates are counted for a subsequent predefined time period:

two polar decodings are performed for each predefined time period, including: a first polar decoding based on Log Likelihood Ratio (LLR) a present predefined time period, and a second polar decoding based on combined LLR in a previous predefined time period and the present predefined time period.

52. The apparatus of item 46, wherein transmissions of the PDCCH are Frequency-Division Multiplexed (FDMed); and for the candidate counting scheme where and two candidates are counted for each predefined time period:

for each predefined time period, one first polar decoding is performed based on Log Likelihood Ratio (LLR) from transmission of a first candidate; and one second polar decoding is performed based on combined LLR from transmissions of the first candidate and a second candidate.

53. The apparatus of item 46, wherein transmissions of the PDCCH are Frequency-Division Multiplexed (FDMed); and for the candidate counting scheme where one candidate is counted for each predefined time period:

for each predefined time period, one polar decoding is performed based on combined Log Likelihood Ratio (LLR) from transmissions of a first candidate and a second candidate.

54. The apparatus of item 46, wherein transmissions of the PDCCH are Frequency-Division Multiplexed (FDMed); and for the candidate counting scheme where three candidates are counted for each predefined time period:

for each predefined time period, one first polar decoding is performed based on Log Likelihood Ratio (LLR) from transmission of a first candidate; one second polar decoding is performed based on Log Likelihood Ratio (LLR) from transmission of a second candidate; and one third polar decoding is performed based on combined LLR from transmissions of the first candidate and the second candidate.

55. The apparatus of any one of items 46 to 54, wherein candidate numbers determined based on the candidate counting scheme for each predefined time period are not expected to exceed a predefined maximum number of monitored PDCCH candidates for each predefined time period 56. The apparatus of any one of items 46 to 55, wherein the predefined time period is a slot or a span.

57. The apparatus of any one of items 46 to 55, wherein the receiver further receives an indication of the candidate counting scheme.

58. The apparatus of any one of items 46 to 55, further comprising:

a transmitter that transmits information for determining the candidate counting scheme.

59. The apparatus of item 58, wherein the process further generates a capability report for determining the candidate counting scheme; and the information comprises the capability report.

60. The apparatus of item 58, wherein the processor further determines the candidate counting scheme; and the information comprises an indication of the candidate counting scheme determined.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method, comprising:
   counting, by a processor, candidates of Physical Downlink Control Channel (PDCCH) that are to be transmitted with a plurality of transmissions, based on a candidate counting scheme, wherein the candidates are linked with one another for transmissions of the PDCCH;
   generating, by the processor, configuration signaling of one or more search space sets for monitoring transmissions of the PDCCH; and
   transmitting, by a transmitter, the configuration signaling and the candidates of the PDCCH.

2. The method of claim 1, wherein transmissions of the PDCCH are Time-Division Multiplexed (TDMed); and one candidate is counted for each predefined time period.

3. The method of claim 1, wherein transmissions of the PDCCH are Time-Division Multiplexed (TDMed); one candidate is counted for an initial predefined time period; and two candidates are counted for a subsequent predefined time period.

4. The method of claim 1, wherein a predefined time period is a slot or a span.

5. The method of claim 1, further comprising:
   receiving, by a receiver, information for determining the candidate counting scheme.

6. The method of claim 5, wherein the information comprises a capability report of a remote device.

7. An apparatus, comprising:
   a transmitter; and
   a processor coupled to the transmitter configured to cause the apparatus to:
      count candidates of Physical Downlink Control Channel (PDCCH) that are to be transmitted with a plurality of transmissions, based on a candidate counting scheme, wherein the candidates are linked with one another for transmissions of the PDCCH;
      generate configuration signaling of one or more search space sets for monitoring transmissions of the PDCCH; and
      transmit the configuration signaling and the candidates of the PDCCH.

8. The apparatus of claim 7, wherein one counted candidate corresponds to one polar decoding for a transmission candidate or a combination of transmission candidates.

9. The apparatus of claim 7, wherein transmissions of the PDCCH are Time-Division Multiplexed (TDMed); and one candidate is counted for each predefined time period.

10. The apparatus of claim 7, wherein transmissions of the PDCCH are Time-Division Multiplexed (TDMed); zero candidate is counted for an initial predefined time period; and one candidate is counted for a subsequent predefined time period.

11. The apparatus of claim 7, wherein transmissions of the PDCCH are Time-Division Multiplexed (TDMed); one candidate is counted for an initial predefined time period; and two candidates are counted for a subsequent predefined time period.

12. The apparatus of claim 7, wherein transmissions of the PDCCH are Time-Division Multiplexed (TDMed); two candidates are counted for an initial predefined time period; and two candidates are counted for a subsequent predefined time period.

13. The apparatus of claim 7, wherein transmissions of the PDCCH are Frequency-Division Multiplexed (FDMed); and two candidates are counted for each predefined time period.

14. The apparatus of claim 7, wherein transmissions of the PDCCH are Frequency-Division Multiplexed (FDMed); and one candidate is counted for each predefined time period.

15. The apparatus of claim 7, wherein transmissions of the PDCCH are Frequency-Division Multiplexed (FDMed); and three candidates are counted for each predefined time period.

16. The apparatus of claim 7, wherein candidate numbers determined based on the candidate counting scheme for each predefined time period are not expected to exceed a predefined maximum number of monitored PDCCH candidates for each predefined time period.

17. The apparatus of claim 7, wherein a predefined time period is a slot or a span.

18. The apparatus of claim 7, wherein the processor is configured to cause the apparatus to transmit an indication of the candidate counting scheme.

19. The apparatus of claim 7, further comprising:
a receiver; and wherein the processor is configured to cause the apparatus to receive information for determining the candidate counting scheme.

20. The apparatus of claim 19, wherein the information comprises a capability report of a remote device.

\* \* \* \* \*